United States Patent [19]
Ginaven

[11] 3,777,893
[45] Dec. 11, 1973

[54] CLASSIFYING AND SCREENING APPARATUS

[75] Inventor: Marvin E. Ginaven, Springfield, Ohio

[73] Assignee: The Bauer Bros. Co., Springfield, Ohio

[22] Filed: June 28, 1971

[21] Appl. No.: 157,254

[52] U.S. Cl................................ 210/499, 209/393
[51] Int. Cl............................................. B01d 39/10
[58] Field of Search.................... 210/483, 485, 495, 210/499; 209/393, 395

[56] References Cited
UNITED STATES PATENTS

| | | | |
|---|---|---|---|
| 3,116,239 | 12/1963 | Bixby | 210/400 |
| 3,169,111 | 2/1965 | Roze et al. | 210/499 |
| 3,452,876 | 7/1969 | Ginaven | 210/409 |
| 3,074,554 | 1/1963 | Mullins | 209/393 |

Primary Examiner—Charles N. Hart
Attorney—Jerome P. Bloom

[57] ABSTRACT

A screen unit including means defining a flow surface characterized by a series of laterally and longitudinally spaced openings, at least a substantial portion of which are laterally extended across the line of flow and of non-uniform dimension, the lateral extent thereof, in the sense of flow. In preferred embodiments the openings have the form of tapered slots defined by wave-line bars or curved wires of non-uniform thickness.

10 Claims, 6 Drawing Figures

PATENTED DEC 11 1973　　　　3,777,893

INVENTOR
MARVIN E. GINAVEN

BY Jerome P. Bloom

ATTORNEY

CLASSIFYING AND SCREENING APPARATUS

BACKGROUND OF THE INVENTION

This invention relates to improvements in screen type separating and classifying devices. It has particular advantage in application to side hill screens and for use in separating a liquid vehicle from entrained solids. It will be described herein with reference to its application to screen type structures such as illustrated in U. S. Pat. No. 3,452,876 issued July 1, 1969.

The separation of solids, particularly fibrous solids, from a liquid waste flow or from a liquid vehicle in the course of a processing step is a problem of utmost concern in many industries. This problem is particularly evidenced, for example, in the pulp and paper industry, the meat processing industry, the tanning industry and that related to sewage disposal. The prime area of concern is threefold, to recover usable materials and/or avoid unnecessary pollution of the environment and to conserve usable liquids. To achieve the objectives of recovery of usable solids, avoiding pollution and conserving usable liquids has proven to be very difficult and to involve, in accordance with conventional practice, much time, labor and expense.

The invention subject of the aforementioned U. S. Pat. No. 3,452,876 has enabled a considerable advance in the solution of the problems above posed. Embodiments have in many applications proven much more effective than other prior art screen devices to simply and economically function and with a substantial degree of efficiency. However, there has yet remained a need for means which will further expedite the more rapid separation of a liquid vehicle from its entrained solids and for means capable, in certain applications, of more effectively acting on a slurry flow wherein the liquid vehicle contains fatty and oily substances or the like of a nature to render it sluggish in movement and most resistant to a fast or ready separation from its entrained solids. The present invention affords the means to answer these needs as evidenced in the prior art.

SUMMARY OF THE INVENTION

The present invention provides for a screen construction to a surface of which a slurry may be applied in a thin sheet-like flow and in the source of such flow rapidly separated into liquid and solid components. It enables an improved and more rapid separation of the liquid component of a slurry from defined solids and in such a manner as to minimize the chance of blinding the screen or any portion thereof. It has most significant applications to the type of slurry wherein the liquid vehicle is relatively thickened by a contained medium and thereby rendered more difficult to separate from the contained solids it is desired to separate.

Embodiments of the invention are characterized by a screen flow surface wherein there are spaced openings which are laterally extended in a sense transverse to the flow of an applied slurry and non-uniform in dimension, within the bounds thereof, in the sense of flow. The arrangement and form of said openings are such that as a sheet-like flow of a slurry is caused to move over the screen flow surface, the liquid vehicle will follow and adhere to the flow surface and, upon reaching said openings, have induced thereon a lateral force influence. This causes the liquid to follow the edges of said openings and to rapidly exit through the screen, as accommodated by the expanded exit through the screen, as accommodated by the expanded portions of the openings. As will be seen, particularly in reference to an inclined screen flow surface, the controlled liquid exit so provided enables a more effective passage of liquid through the screen in a single pass, particularly where the liquid is relatively thickened, than in the case where the screen openings are defined in parallel edges.

In preferred embodiments of the invention, the screen is defined by bars or wires in conjunction with underlying tie bars so arranged to produce screen openings in the nature of tapered slots. Apex portions of said slots will be directed in the sense of flow to define expanded portions thereof in the sense of flow.

It is therefore a primary object of the invention to provide improvements in screening and classifying units of the class described rendering them economical to fabricate, more efficient and satisfactory in use and adaptable to a wider variety of applications.

Another object of the invention is to provide a screen or classifying unit the flow surface of which is less likely to blind when subjected to a flowing slurry.

A further object of the invention is to provide a screen flow surface characterized by the screen openings being defined by an improved wire or bar form which increase its separating efficiency.

Another object of the invention is to provide an inclined screen unit capable of exerting an improved and more rapid separation of useful solids from a flowing slurry.

Another object of the invention is to provide a more effective screen means for extracting liquid from a slurry flow embodying defined solids, even where the liquid embodies substances which would ordinarily interfere with and blind the flow passages provided in conventional screen structures.

A further object of the invention is to provide a tapered slot screen possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein one but not necessarily the only form of embodiment of the invention is shown, FIG. 1 is a view of a screen section embodying the improvements of the present invention;

Figure 2:
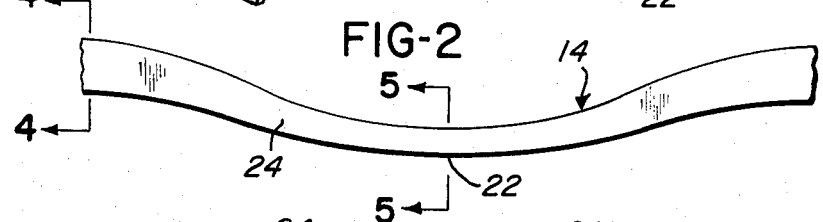
FIG. 2 is a perspective view of a section of a bar or wire element embodied in the screen section of FIG. 1.
Figure 4:
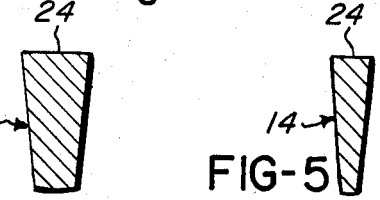
Figure 5:
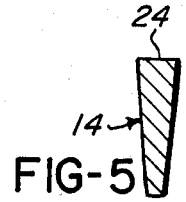
Figure 6:
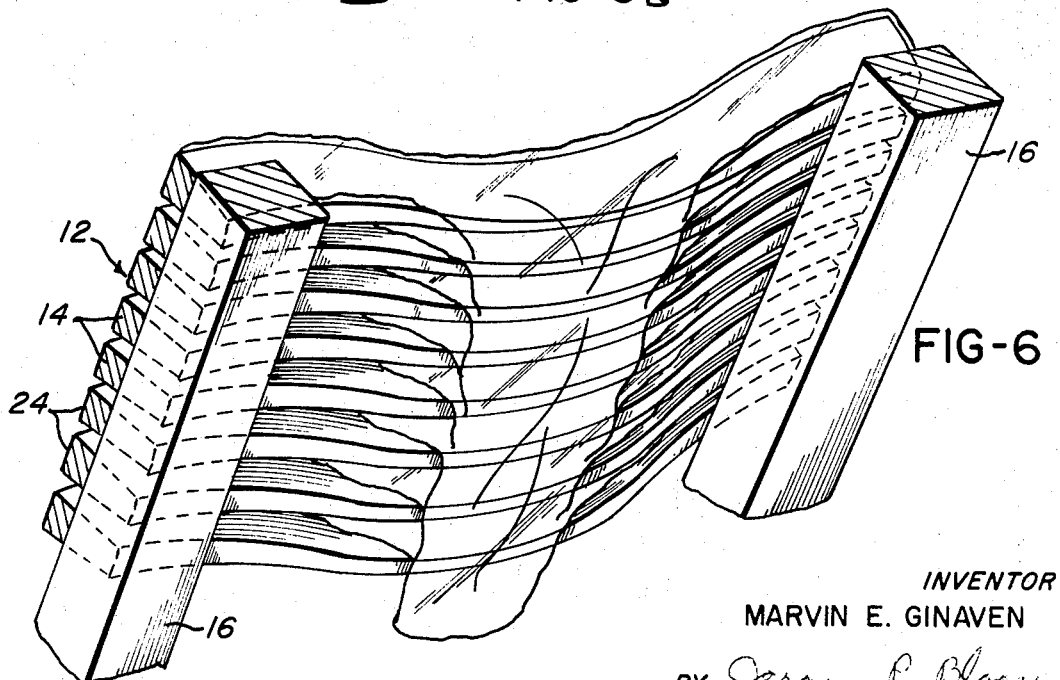

FIGS. 4 and 5 are sectional views taken respectively on lines 4—4 and lines 5—5 of FIG. 2, and rotated 90°; and FIG. 6 illustrates the throughflow achieved at the underside of the screen illustrated.

Like parts are indicated by similar characters of reference throughout the several views.

Referring to the drawings, the invention is illustrated as embodied in an inclined screen unit 10 over the surface 12 of which a slurry will be caused to move in a sheet-like flow for separating or classifying purposes.

To comprehend the nature and character of the separating action of the invention structure, one must understand that as a sheet-like flow of slurry moves down the inclined flow surface 12, the liquid component thereof will tend to adhere to and follow the line of the flow surface. At the same time contained solids will inherently move up to the upper or outermost layers of the flow to skim over the screen openings, as liquid, following the line thereof, exits therethrough.

Now looking to the drawings in detail, it may be seen that, in accordance with the preferred embodiment of the invention there illustrated, the screen 10 is comprised of bars or wires 14 arranged in longitudinally spaced relation and oriented transversely of and generally at right angles to the direction of anticipated flow. At their undersurface, the bars 14 are bridged by and interconnected through the medium of longitudinally extending, transversely spaced, tie bars 16. The upper edges of the bars 14 define the screen flow surface which has preferably but not necessarily, a planar configuration. The flow surface may, for example, be formed as a series of successively inclined planar segments as illustrated in the aforementioned U. S. Pat. No. 3,452,876.

It is noted that only so much of a screen structure is here shown and described as may be necessary for an understanding of the invention, and particularly the flow surface defined thereby. As to conventional framing, feed and/or orientation thereof in use, reference is had by way of example to such structure and disclosure as evidenced in said U. S. Pat. No. 3,452,876. With knowledge thereof and the present disclosure, any mechanic versed in the art can embody the present invention in effecting an improved side hill type screen unit the flow surface of which may be in single or plural planes.

As seen in the drawings, the bars or wires 14 form, with the tie bars 16, a series of transversely and longitudinally spaced screen openings or slots 18 of a laterally extended tapered character. Thus, while generally uniform in width, as shown, the slots are non-uniform in dimension of their opening in the sense of flow.

Each bar or wire 14 is designed to present a single arc between adjacent tie bars 16, the apex 22 of which is centered and projected in the sense of flow. This arc is defined by a bar or wire segment which, in the sense of flow and in the screen flow surface has a changing thickness. As seen, the acr is thinned at the apex 22 and gradually thickened from such apex to the lateral extremities of the arc at the adjacent tie bars 16. As a consequence, the assembly of the bars or wires 14 to the tie bars 16 produces screen openings or slots 18 which are expanded to present a maximum dimension in the sense of flow at their centers and formed to taper to a reducing dimension in the sense of flow to their lateral extremities.

Figure 1:
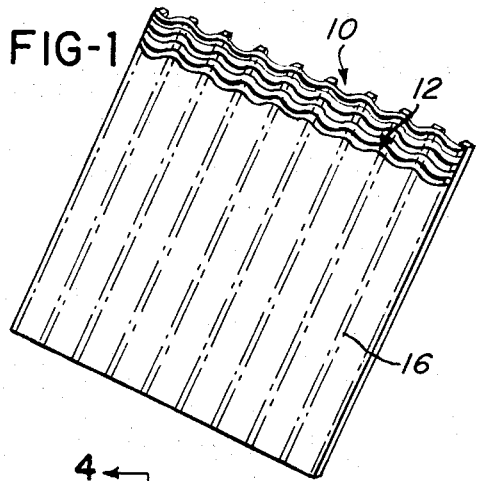
Figure 3:
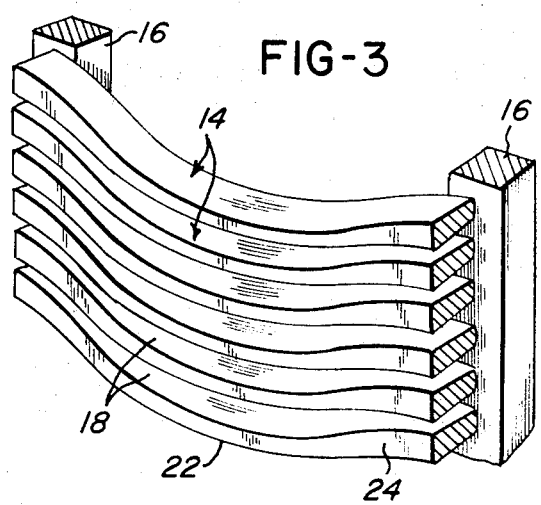
FIG. 3 is an enlarged plan view of a segment of the screen flow surface.

In the preferred form of bar or wire 14, the cross section thereof will be of a generally triangular character, the base portion 24 of the bars being uppermost and defining the screen flow surface. As seen in FIGS. 3 and 5 the triangular cross section of each bar 14 at the apex portions 32 thereof is thinned.

Thus, the invention provides, in preferred embodiment, an inclined flow surface which is defined by base portions 24 of the bars or wires 14. Defined in said flow surface, by the arc formed segment structure of bars or wires 14, are the tapered openings or slots 18, the lateral extremities of which are defined by adjacent tie bars 16. Further, the slots 18 are so tapered to present the maximum dimension thereof in the direction of flow across the surface 12 at their centers.

With the flow surface of a screen unit such as described inclined to a horizontal, on delivery of a slurry embodying fibrous solids to move in a sheet-like flow across the surface 12 from the upper limit thereof, the following will occur. The liquid vehicle of the desirable solids will move down over the flow surface with the underlayer thereof adhering to and following the lines of the bars or wires 14 and the arcuate edges of the slots 18 defined thereby. As a natural consequence of the slurry flow, the desirable solids will be lifted and moved to the upper or outer layers of the flow, causing such solids to tend to skim over the slots. As the liquid underlayer of the slurry flow reaches a slot, following the lines of the rimming edge thereof, lateral force effects will be induced in the liquid. The result is a sidewise movement of liquid away from the tie bars 16 and to the apex portions 22 of the bars 14. Thus, the primary path for exit of the liquid is concentrated at the widest portion of the screen opening or slot. Moreover, as the liquid will follow the bar line, it bends around the bars 14 from the screen flow surface and, in moving to and through the screen openings, it is concentrated and centered so as to increase the velocity of its through flow.

A result of the described action of the liquid vehicle following the line of the apex portions 22 is to more effectively clean the slots and prevent blinding by contained substances. This is most important in the case of slurries of a more sluggish character, such as those which may embody fatty or oily substance.

The invention thus expands the effective capabilities of screens of the type described.

The significance of the concentrated and speedy separation of a liquid vehicle is seen with reference to FIG. 6 of the drawings which shows the flow through characteristics of a separated liquid at the bottom of the invention screen.

Of course there is a successive separation of the liquid vehicle in the course of the slurry flow down the incline of the screen 10, leaving to discharge from the surface of a screen a most desirable solid portion of a slurry.

The net result is a substantial savings in time, effort and expense for the procedure described, particularly in the case of normally difficult to separate substances, and optimal speedy reclamation of applied substances.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. Screening and classifying apparatus including means defining a flow surface characterized by laterally and longitudinally spaced openings which are laterally extended across the line of flow and of non-uniform dimension, the lateral extent thereof, in the sense of flow, said means defining said flow surface including surface portions of a series of longitudinally spaced transversely oriented screen bars having underlying support means which together with said screen bars define said openings, said surface portions of said bars varying in thickness between adjacent of said underlying support means to produce the said non-uniform dimension of said openings.

2. Screening and classifying apparatus including means defining a flow surface characterized by laterally and longitudinally spaced openings which are laterally extended across the line of flow and of non-uniform dimension, the lateral extent thereof, in the sense of flow, the means defining said flow surface including surface portions of a series of longitudinally spaced transversely oriented screen bars having underlying support means which together with said screen bars define said openings, at least a portion of said bars between adjacent of said support means having an arcuate form the apex portion of which is projected in the sense of flow to produce an arcuate edge portion defining limits of adjacent openings, said apex portions of said screen bars being thinned relative adjacent portions to provide a non-uniform dimension of said openings.

3. In a screen type separator in which bar-like elements form a flow surface comprised of longitudinally spaced apart laterally elongated flow openings, said elements being formed to produce openings curving in the sense of flow; the improvement which consists in using bar-like elements having curved portions which are relatively thinned in curved portions thereof to produce curved openings which at apex portions are relatively elongated in the sense of flow.

4. A screen type separator according to claim 3 in which said bar-like elements are progressively thinned in their curved portions to achieve a minimum thickness at apex portions thereof producing openings gradually expanding in the sense of flow toward said apex portions.

5. In a screen type separator presenting a screen surface inclined to the horizontal and over which a fluent material is caused to flow from a raised to a lower end with portions of the fluent material separating by escape through the screen surface, transversely disposing screen bars forming said screen surface and longitudinally spaced apart to define lateral open screen area therebetween, said bars including portions curving downwardly in the sense of flow and being relatively thinned in said curved portions to form an open screen area between adjacent bars which includes a portion curved in the sense of flow and in which the spacing between said bars is non-uniform.

6. A screen type separator according to claim 5, wherein the open screen area at said curved portion gradually expands in the sense of flow to a maximum dimension at the lowest part of the defined curve.

7. A screen type separator according to claim 5, wherein the screen surface is comprised of a plurality of said bars and a plurality of laterally spaced apart longitudinally extending tie members interconnecting said bars in a unitary assembly, each bar between each adjacent pair of tie members being projected to an arc-like configuration forming a curved portion and being gradually thinned from base portions to an apex portion, adjacent bars nesting said curved portions and defining therebetween a lateral open area which gradually expands from said base portions to said apex portion.

8. In a screen type separator presenting a screen surface inclined to the horizontal and over which a fluent material is caused to flow from a raised to a lower end with fluid portions of the fluent material separating by escape through the screen surface, transversely disposing screen bars forming said screen surface and longitudinally spaced apart to define lateral open screen area therebetween, said screen bars including portions curving downwardly in the sense of flow, and tie rods of longitudinal extent laterally spaced apart and interconnecting said screen bars to define the longitudinal spacing thereof, said screen bars having a continuous non-uniform curvature of at least portions of following edge portions thereof between adjacent tie rods to provide between adjacent tie rods and between adjacent screen bars an open screen area which gradually widens toward a longitudinal center plane intermediate said tie rods to achieve a side-to-center flow of fluent material reducing wedging of solids in the open area of said separator as fluid is withdrawn by induced wall attachment from the bar surfaces.

9. A screen type separator according to claim 8, wherein there is at least a pair of said laterally spaced apart longitudinally extending tie rods interconnecting said screen bars, each screen bar between adjacent tie rods being continuously projected to an arc-like configuration forming a curved portion terminating in an apex portion positioning centrally of said tie rods, adjacent screen bars positioning to nest curved portions thereof and to define therebetween a lateral open area which gradually expands from said tie rods to said apex portions.

10. In a screen type separator presenting a screen surface inclined to the horizontal and over which a fluent material is caused to flow from a raised to a lower end with fluid portions of the fluent material separating by escape through the screen surface, transversely disposing screen bars forming said screen surface and longitudinally spaced apart to define lateral open screen area therebetween, and at least a pair of laterally spaced apart longitudinally extending tie rods interconnecting said screen bars, at least a portion of adjacent screen bars being so relatively positioned and so configured as to define therebetween a slot-like opening projected in the sense of flow to an arcuate configuration terminating in an apex substantially centrally positioned between said tie rods, said slot-like opening gradually widening from said tie rods to said apex.

* * * * *

UNITED STATES PATENT OFFICE
CERTIFICATE OF CORRECTION

Patent No. 3,777,893    Dated December 11, 1973

Inventor(s) Marvin E. Cinaven

It is certified that error appears in the above-identified patent and that said Letters Patent are hereby corrected as shown below:

Column 1, line 44, "source" is amended to read -- course --.

line 68, "as accommodated by the expanded exit through" is deleted.

Column 2, line 1, "the screen," is deleted;

line 7, "in" is amended to read -- by --.

Column 3, line 43, "acr" is amended to read -- arc --;

line 62, "32" is amended to read -- 22 --.

Signed and sealed this 23rd day of April 1974.

(SEAL)
Attest:

EDWARD M. FLETCHER, JR.
Attesting Officer

C. MARSHALL DANN
Commissioner of Patents